(12) United States Patent
Yim

(10) Patent No.: US 6,337,716 B1
(45) Date of Patent: Jan. 8, 2002

(54) RECEIVER FOR SIMULTANEOUSLY DISPLAYING SIGNALS HAVING DIFFERENT DISPLAY FORMATS AND/OR DIFFERENT FRAME RATES AND METHOD THEREOF

(75) Inventor: Myung-sik Yim, Seoul (KR)

(73) Assignee: Samsung Electronics Co., Ltd., Kyungki-Do (KR)

( * ) Notice: Subject to any disclaimer, the term of this patent is extended or adjusted under 35 U.S.C. 154(b) by 0 days.

(21) Appl. No.: 09/456,498

(22) Filed: Dec. 8, 1999

(30) Foreign Application Priority Data

Dec. 9, 1998 (KR) .............................. 98-53934

(51) Int. Cl.$^7$ .............................. H04N 5/46; H04N 7/01
(52) U.S. Cl. ................ 348/554; 348/446; 348/555; 348/558
(58) Field of Search ................ 348/553, 554, 348/555, 556, 558, 441, 446, 458, 563, 564, 565; H04N 5/44, 3/27, 5/46, 7/01

(56) References Cited

U.S. PATENT DOCUMENTS 4,685,002 A * 8/1987 Powers .................. 348/550
5,530,484 A * 6/1996 Bhatt .................... 348/556

* cited by examiner

Primary Examiner—Sherrie Hsia
(74) Attorney, Agent, or Firm—Sughrue Mion, PLLC

(57) ABSTRACT

A receiver for simultaneously displaying signals having different display formats and/or different frame rates, and a method thereof are provided. The receiver includes a signal generator, a first display processor, and a second display processor. The signal generator generates a first vertical synchronous signal for a high definition (HD) image, a first field identification signal for coping with a case in which an HD image is an interlace image, a second vertical synchronous signal for a standard image, and a second field identification signal for a standard image. The first display processor processes a received HD decoded image to an HD display format according to the first vertical synchronous signal and the first field identification signal. The second display processor down-samples the HD decoded image using the first and second vertical synchronous signals and the first and second field identification signals, and provides a standard definition (SD) image signal having a standard display format that is different from the HD display format. Accordingly, the receiver can simultaneously reproduce a high definition signal and a standard definition image signal corresponding to the picture quality of TVs which have already been commonly used, the two signals having different display formats and/or different frame rates.

19 Claims, 4 Drawing Sheets

FIG. 4

| No. | 1280x720 progressive | PAL FORMAT Top Field | | PAL FORMAT Bottom Field | |
|---|---|---|---|---|---|
| 0 | X | X | 0 | | |
| 1 | X | | | X | 1.25 |
| 2 | X | | | | |
| 3 | X | X | 2.5 | | |
| 4 | X | | | X | 3.75 |
| 5 | X | X | 5 | | |
| 6 | X | | | X | 6.25 |
| 7 | X | | | | |
| 8 | X | X | 7.5 | | |

FIG. 5

| No. | 1920x1080 Interlace Top | 1920x1080 Interlace Bottom | PAL FORMAT Top Field | | PAL FORMAT Bottom Field | |
|---|---|---|---|---|---|---|
| 0  | X |   | X | 0 |   |   |
| 1  |   | X |   |   |   |   |
| 2  | X |   |   |   | X | 2 |
| 3  |   | X |   |   |   |   |
| 4  | X |   | X | 4 |   |   |
| 5  |   | X |   |   |   |   |
| 6  | X |   |   |   | X | 6 |
| 7  |   | X |   |   |   |   |
| 8  | X |   | X | 8 |   |   |
| 9  |   | X |   |   |   |   |
| 10 | X |   |   |   | X | 10 |
| 11 |   | X |   |   |   |   |
| 12 | X |   | X | 12 |   |   |
| 13 |   | X |   |   |   |   |
| 14 | X |   |   |   | X | 14 |

RECEIVER FOR SIMULTANEOUSLY DISPLAYING SIGNALS HAVING DIFFERENT DISPLAY FORMATS AND/OR DIFFERENT FRAME RATES AND METHOD THEREOF

BACKGROUND OF THE INVENTION

1. Field of the Invention

The present invention relates to a receiver, and more particularly, to a receiver for simultaneously displaying a high definition (HD) signal and a standard image signal which have different display formats and/or different frame rates, and a method thereof.

2. Description of the Related Art

MP @ML (main profile at main level) video decoders, which have been proposed by the moving picture experts group (MPEG) of the International Standards Organization for a recent completely-developed two dimensional moving picture decoding and transmission technique, have a resolution of the same level as that of standard definition television (SDTV) and have been widely used with the advent of digital broadcasting and various multimedia apparatuses. Also, the development of high definition television (HDTV) having a MP @HL (main profile at high level) resolution has begun, and some HDTVs having a MP @HL resolution have already seen common use.

In the near future, Europe will also start HDTV broadcasting in a digital format. When a United States-type display format is used, new HDTV receivers will be required for viewers to watch the HDTV broadcasting in a digital format, so that existing NTSC- or PAL-format TV may be of no use. To prevent this problem, a set-top box must be installed in an NTSC- or PAL-format TV to receive HD signals. That is, at the start of digital HD broadcasting, the coexistence of the digital HD broadcasting with existing NTSC- or PAL broadcasting cannot be avoided. Thus, HDTV receivers must be able to receive NTSC/PAL signals as well as HD signals, and existing NTSC TVs and PAL TVs must be able to receive the outputs of the HDTV receivers and display them on a screen.

Accordingly, when nations which use PAL-format broadcasting introduce a United States-type digital HD broadcasting standard (for example, 1920 pixels×1080 lines×60 Hz interlace image or 1280 pixels×720 lines×60 Hz progressive image), a set-top box or an HDTV receiver must have a structure capable of converting an HD signal to a PAL signal to process the two types of broadcasting signals, since the PAL broadcasting signal has a 50 Hz vertical frequency which is different from that of the United States-type digital HD broadcasting standard of 60 Hz. That is, the two types of broadcasting signals have different frame rates. For example, when it is intended for an HDTV to use a video cassette recorder (VCR) for recording a currently-used PAL broadcasting signal or to display a received HD signal on a PAL broadcasting standard receiver while simultaneously displaying the HD signal, or when it is intended for a PAL receiver, including a set-top box, to display an HD signal, the HDTV receiver or the PAL receiver including a set-top box should have a structure capable of converting an HD signal to a PAL signal.

SUMMARY OF THE INVENTION

An objective of the present invention is to provide a receiver for simultaneously displaying a high definition (HD) signal and a standard definition (SD) image signal which have different display formats and/or different frame rates.

Another objective of the present invention is to provide a method of simultaneously displaying an HD signal and an SD image signal which have different display formats and/or different frame rates on a TV including a set-top box or on a receiver such as a high definition television (HDTV).

Accordingly, to achieve the first objective, the present invention provides a receiver including: a signal generator for generating a first vertical synchronous signal for a high definition (HD) image, a first field identification signal for coping with a case in which an HD image is an interlace image, a second vertical synchronous signal for a standard image, and a second field identification signal for a standard image; a first display processor for processing a received HD decoded image to an HD display format according to the first vertical synchronous signal and the first field identification signal; and a second display processor for down-sampling the HD decoded image using the first and second vertical synchronous signals and the first and second field identification signals, and providing a standard definition (SD) image signal having a standard display format that is different from the HD display format.

To achieve the second objective, the present invention provides a method of simultaneously displaying signals having different display formats and/or different frame rates, the method including the steps of: (a) decoding a received high definition (HD) image and providing an HD decoded image; (b) processing the HD decoded image to an HD display format according to a first vertical synchronous signal and a first field identification signal for coping with the case in which the HD image is an interlace image; and (c) down-sampling the HD decoded image using the first vertical synchronous signal for an HD image, the first field identification signal for an HD image, a second vertical synchronous signal for a standard image, and a second field identification signal for a standard image, and providing a standard image signal having a standard display format that is different from the HD display format.

BRIEF DESCRIPTION OF THE DRAWINGS

The above objectives and advantage of the present invention will become more apparent by describing in detail a preferred embodiment thereof with reference to the attached drawings in which:

FIG. 4 shows an example of vertical interpolation for a PAL signal when a 1280 pixels×720 lines progressive high definition image is received; and FIG. 5 shows an example of vertical interpolation for a PAL signal when a 1920 pixels×1080 lines interlaced high definition image is received.

DESCRIPTION OF THE PREFERRED EMBODIMENT

A receiver according to the present invention can be a high definition television (HDTV) receiver capable of reproducing both a high definition (HD) signal and a standard image signal having a standard definition (SD) corresponding to the picture quality of existing TV, for example, a PAL signal, or can be a commonly-used PAL TV receiver having a set-top box. The receiver according to the present invention is shown in FIG. 1.

Figure 1:
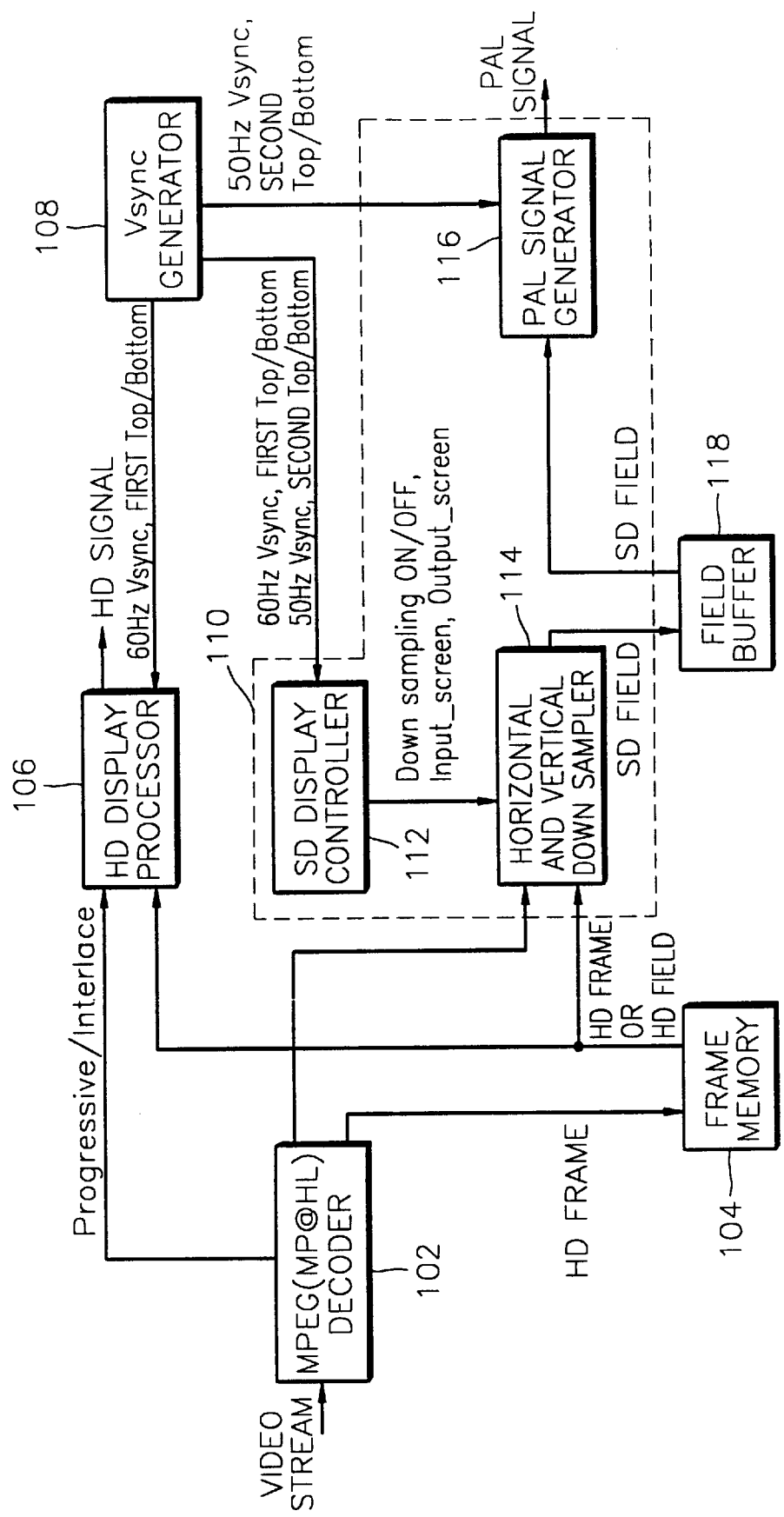
FIG. 1 is a block diagram of a receiver for simultaneously displaying signals having different display formats and/or different frame rates, according to the present invention, which is applied to a high definition receiver or a set-top box.

In FIG. 1, the receiver according to the present invention includes an MPEG decoder 102, a frame memory 104, an HD display processor 106, a vertical synchronous signal (Vsync) generator 108, an SD display processor 110, and a field buffer 118. Here, the SD display processor 110 includes an SD display controller 112, a horizontal and vertical down sampler 114, and a PAL signal generator 116. The HD display processor 106 and the SD display processor 110 can be referred to as first and second display processors, respectively.

The MPEG decoder 102 is an MP @HL decoder, and decodes a video bitstream of an HD signal which has been compression-coded and received, and stores the decoded data in the frame memory 104. The HD display processor 106 reads the decoded data from the frame memory 104 in accordance with a digital HD broadcasting standard (1920 pixels×1080 lines×60 Hz interlace image, 1280 pixels×720 lines×60 Hz progressive image, or the like) in units of a frame or field, and outputs the decoded HD signal to a display device such as a cathode ray tube (CRT) or a monitor.

That is, when a current decoded image provided from the MPEG decoder 102 is an interlace image, data is read from the frame memory 104 in units of an HD field. When the current decoded image is a progressive image, data is read from the frame memory 104 in units of an HD frame.

The Vsync generator 108 produces a 60 Hz vertical synchronous signal Vsync (which can be referred to as a first vertical synchronous signal 60 Hz Vsync) and a first top/bottom signal Top/Bottom (which can be referred to as a first field identification signal) informing whether the 60 Hz Vsync is a top or bottom field for an input HD interlaced image, and provides them to the HD display processor 106. Also, the Vsync generator 108 produces a 50 Hz vertical synchronous signal Vsync (which can be referred to as a second vertical synchronous signal 50 Hz Vsync) and a second top/bottom signal Top/Bottom (which can be referred to as a second field identification signal) informing whether the 50 Hz Vsync is a top or bottom field for an output PAL interlaced image, and provides them to the PAL signal generator 116. The 60 Hz Vsync, the first Top/Bottom, the 50 Hz Vsync and the second Top/Bottom are provided to the SD display controller 112.

The SD display processor 110 outputs a European type PAL broadcasting standard (720 pixels×576 lines×50 Hz interlace image) signal. That is, the SD display controller 112 of the SD display processor 110 controls the horizontal and vertical down sampler 114 according to the 60 Hz first vertical synchronous signal, the first top/bottom signal, the 50 Hz second vertical synchronous signal, and the second top/bottom signal which are provided from the Vsync generator 108, to produce PAL broadcasting standard field data and store it in the field buffer 118. The memory size of the field buffer 118 is 414,720 bytes/field (=720 bytes×pixels/line×576 lines/frame×½ frames/field×2(luminance signal+color signal)) which is the size of SD field data.

The horizontal and vertical down sampler 114 horizontally and vertically down samples HD data which is read from the frame memory 104, according to commands (Down sampling ON/OFF, Input_screen, and Output_screen) generated by the SD display controller 112, and generates data having the size of a PAL broadcasting standard field screen. The PAL signal generator 116 reads SD field data from the field buffer 118 and generates a PAL image signal.

Alternatively, the SD display processor 110 can generate an NTSC signal having the same frame rate as an HD signal and a different display format from the HD signal, instead of the PAL signal, which has a different display format and a different frame rate from those of the HD signal. The HD display processor 106 can have a different digital HD broadcasting standard instead of the United States-type digital HD broadcasting standard.

The operations of the present invention will now be described with reference to FIGS. 2 through 5, when a received image is a 1280 pixels×720 lines×60 Hz progressive HD signal, and when a received image is a 1920 pixels×1080 lines×60 Hz interlace HD signal.

1. A case in which a received image is a 1280 pixels×720 lines×60 Hz progressive HD signal The MPEG decoder 102 decodes a progressive image of 1280 pixels×720 lines, generates frames at a rate of 60 frames per second, and stores the frames in the frame memory 104. The HD display processor 106 reads frame image data from the frame memory 104 according to the progressive/interlace signal. Progressive/Interlace provided from the MPEG decoder 102 and the first vertical synchronous signal 60 Hz Vsync generated by the Vsync generator 108, and displays the read frame image data on a screen.

When the HD display processor 106 reads the frame image data from the frame memory 104, the horizontal and vertical down sampler 114 of the SD display processor 110 simultaneously reads data from the frame memory 104 and performs the following operation.

Figure 2:
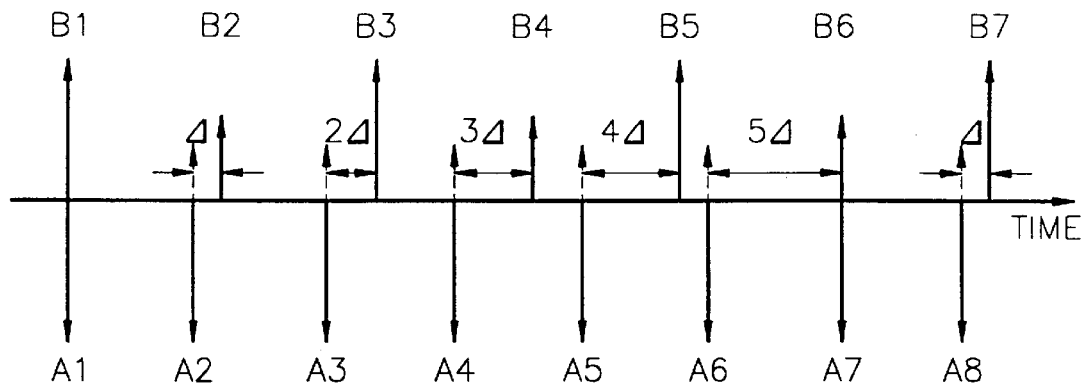
FIG. 2 is a timing diagram illustrating the principle of operation of the standard definition (SD) and high definition (HD) display processors shown in FIG. 1.

First, the SD display controller 112 calculates the interval between the first vertical synchronous signal 60 Hz Vsync and the second vertical synchronous signal 50 Hz Vsync as shown in FIG. 2. In FIG. 2, B1, B2, B3, . . . are 50 Hz PAL field vertical synchronous signals, among which B1, B3, B5, . . . are top fields, and B2, B4, B6, . . . are bottom fields. Since the received HD screen is the progressive screen, A1, A2, A3, A4, . . . are 60 Hz frame vertical synchronous signals.

The SD display controller 112 generates a downsampling on/off signal Down sampling ON/OFF, an input screen control signal Input_screen, and an output screen control signal Output_screen as shown in the following Table 1, on the basis of the interval between the 60 Hz vertical synchronous signal and the 50 Hz vertical synchronous signal calculated as shown in FIG. 2, and provides the generated signals to the horizontal and vertical down sampler 114. Here, the downsampling on/off signal Down sampling ON/OFF determines whether the horizontal and vertical down sampler 114 will operate or not. The input screen control signal Input_screen and the output screen control signal Output_screen, which are required for vertical direction interpolation classification, each indicate whether a received HD screen is frame data, a top field or a bottom field and whether an output PAL (SD) screen field is a top field or a bottom field.

The horizontal and vertical down sampler 114 receives HD frame data according to the downsampling on/off signal Down sampling ON/OFF, the input screen control signal Input_screen, and the output screen control signal Output_screen which are generated by the SD display controller 112, and generates a PAL top field or a PAL bottom field.

TABLE 1

| Time | Interval between 60 Hz Vsync and 50 Hz Vsync | Down-sampling on/off | vertical direction interpolation classification | |
|---|---|---|---|---|
| | | | input HD screen | output PAL (SD) screen field |
| A1 | 0 | On | Frame | Top |
| A2 | Δ | On | Frame | Bottom |
| A3 | 2 × Δ | On | Frame | Top |
| A4 | 3 × Δ | On | Frame | Bottom |
| A5 | 4 × Δ | On | Frame | Top |
| A6 | 5 × Δ | Off | Frame | Invalid |
| A7 | 0 | On | Frame | Bottom |
| A8 | Δ | On | Frame | Top |

The SD display controller 112 always determines the interval between the 60 Hz vertical synchronous signal Vsync and the 50 Hz vertical synchronous signal Vsync in synchronization with the 60 Hz vertical synchronous signal which is provided from the Vsync generator 108. Here, the time from the determination time to when the next 50 Hz vertical synchronous signal is received is called "delay time" and is calculated to be a multiple of Δ. Down sampling by the horizontal and vertical down sampler 114 is not performed when the delay time is 5×Δ, but performed for all other delay times.

Figure 3:
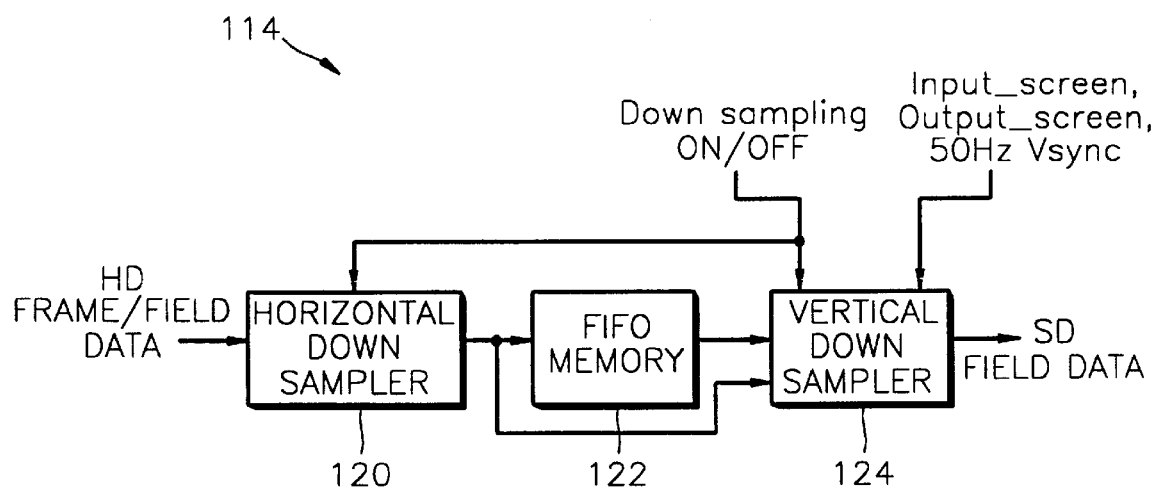
FIG. 3 is a detailed block diagram of the horizontal and vertical down sampler shown in FIG. 1.

That is, the horizontal down sampler 120 shown in FIG. 3 horizontally down-samples 1280 pixels to 720 pixels if a downsampling "on" signal is received, and stores the result of the horizontal down sampler 120 in the FIFO memory 122 for storing data of one line and simultaneously provides the result of the horizontal down sampler 120 to the vertical down sampler 124.

The vertical down sampler 124 performs vertical down-sampling as shown in FIG. 4 using previously down-sampled horizontal line data provided from the FIFO memory 122 and current down-sampled horizontal line data provided from the horizontal down sampler 120 without passing through the FIFO memory 122.

FIG. 4 shows the locations of vertical lines to be output to convert a 1280 pixels×720 lines progressive HD image to a PAL signal. For example, a line No. 0 of a received HD screen is output without change as the first output line for the top field of a PAL signal, and line Nos. 2 and 3 of the received HD screen are interpolated and output as the second output line, which are accomplished by vertical downsampling.

Also, line Nos. 1 and 2 of the received HD screen are interpolated at a ratio of 3:1 and output as the first output line for the bottom field of a PAL signal, and line Nos. 3 and 4 of the received HD screen are interpolated at a ratio of 1:3 and output as the second output line. In this way, each field includes 288 lines.

Field data of 288 lines, which conforms with the PAL broadcasting standard, is produced through the operations of the SD display controller 112 and the horizontal and vertical down sampler 114. The SD field data is stored in the field buffer 118. The PAL signal generator 116 sequentially reads data from the field buffer 118 and displays the read data on a PAL standard monitor or records the read data in a PAL standard VCR.

Additionally, when a PAL signal is generated using only the frame memory 104 without using the field buffer 118, the amount of data which is transmitted from the frame memory 104 per second is 110.592 MByte/sec (=1280 (byte/line)× 720 (line/frame)×60 (frame/sec)×2 (writing, reading)).

However, when both the frame memory 104 and the field buffer 118 are used to generate a PAL signal, the amount of data transmitted is 76.032 MByte/sec (=120 (byte/line)×720 (line/frame)×60 (frame/sec)×1 (reading)+720 (pixel/line)× 288 (line/field)×50 (field/sec)×2 (writing, reading)). Accordingly, the amount of data transmitted from the frame memory 104 can be reduced by using the field buffer 118.

2. A case in which a received image is a 1920 pixels×1080 lines×60 Hz interlace HD signal.

In this case, a top field and a bottom field constitutes a frame. The MPEG decoder 102 shown in FIG. 1 decodes a 1280 pixels×620 lines image, generates frames at a rate of 30 frames per second, and stores the frames in the frame memory 104.

The HD display processor 106 reads HD field image data twice from the frame memory 104 according to the progressive/interlace signal. Progressive/Interlace provided from the MPEG decoder 102 and the first vertical synchronous signal 60 Hz Vsync and the first top/bottom signal (first Top/Bottom), which are generated by the Vsync generator 104, form a frame with the read frame image data, and displays the frame. When the HD display processor 106 reads the HD field image data from the frame memory 104, the horizontal and vertical down sampler 114 of the SD display processor 110 simultaneously reads data from the frame memory 104 and performs the following operation.

First, the SD display controller 112 calculates the interval between the first vertical synchronous signal 60 Hz Vsync and the second vertical synchronous signal 50 Hz Vsync as shown in FIG. 2, generates a downsampling on/off signal Down sampling ON/OFF as shown in the following Table 2, and an input screen control signal Input_screen and an output screen control signal Output_screen, which are required for vertical interpolation classification, on the basis of the calculated interval, and provides the generated signals to the horizontal and vertical down sampler 114.

TABLE 2

| Time | Interval between 60 Hz Vsync and 50 Hz Vsync | Down-sampling ON/OFF | vertical direction interpolation classification | |
|---|---|---|---|---|
| | | | input HD screen | output PAL (SD) screen field |
| A1 | 0 | On | Top field | Top |
| A2 | Δ | On | Bottom field | Bottom |
| A3 | 2 × Δ | On | Top field | Top |
| A4 | 3 × Δ | On | Bottom field | Bottom |
| A5 | 4 × Δ | On | Top field | Top |
| A6 | 5 × Δ | Off | Bottom field | Invalid |
| A7 | 0 | On | Top field | Bottom |
| A8 | Δ | On | Bottom field | Top |

Here, down sampling by the horizontal and vertical down sampler 114 is not performed when the delay time of the 50 Hz vertical synchronous signal with respect to the 60 Hz synchronous signal is 5×Δ, but performed for all other delay times as shown in FIG. 5.

FIG. 5 shows the locations of vertical lines to be output to generate a PAL signal from a 1920 pixels×1080 lines interlace HD image. For example, a PAL output for the top field can take line data positioned at lines Nos. 0, 4, 8, . . . when a received HD screen is a top field. When the received HD screen is a bottom field, data on line No. 0 is produced, data on line No. 4 is obtained by interpolating the line data on line Nos. 3 and 5, and line data on line No. 8 is obtained by interpolating line data on lines 7 and 9. In this way, PAL (SD) field data of 288 lines are produced.

Also, when a received HD screen is a top field, a PAL output for the bottom field can take line data positioned at lines Nos. 2, 6, 10, . . . . When the received HD screen is a bottom field, line data on line No. 2 is obtained by interpolating line data on line Nos. 1 and 3, line data on line No. 6 is obtained by interpolating the line data on line Nos. 5 and 7, and line data on line No. 10 is obtained by interpolating line data on lines 9 and 11. In this way, SD field data of 288 lines are produced.

When interpolation of two line data is required, line data which has been stored in the FIFO memory 122, and line data which is later than the above line data and directly provided from the horizontal down sampler 120 without passing through the FIFO memory 122, are interpolated in the vertical down sampler 124 shown in FIG. 3. In this way, the vertical downsampling is performed. When interpolation of line data is not required, the vertical down sampler 124 can down sample data which is provided directly from the horizontal down sampler 120 without passing through the FIFO memory 122.

Data of 576 active lines, which conforms with the PAL broadcasting standard, must be produced through the operations of the SD display controller 112 and the horizontal and vertical down sampler 114. However, when a slightly insufficient amount of data is produced, the amount of shortage is processed as a blank. The PAL signal generator 116 sequentially reads data from the field buffer 118 and displays the read data on a PAL standard monitor or records the read data in a PAL standard VCR.

Additionally, when a PAL signal is generated using only the frame memory 104 without using the field buffer 118, the amount of data which is transmitted per second from the frame memory 104 is 124.416 MByte/sec (=1920 (byte/line)×540 (line/field)×60 (field/sec)×2 (writing, reading)). However, when both the frame memory 104 and the field buffer 118 are used to generate a PAL signal, the amount of data transmitted is 66.208 MByte/sec (=12920 (byte/line)× 540 (line/field)×60 (field/sec)×1 (reading)+720 (byte/line)× 288 (line/field)×50 (field/sec)×2 (writing, reading)). Accordingly, the amount of data transmitted from the frame memory 104 can be reduced by using the field buffer 118.

As described above, the present invention can reproduce a high definition signal having a different display format from a standard image signal, simultaneously with the standard image signal having a standard resolution corresponding to the picture quality of TVs which have already been commonly used. Also, the present invention can reduce the amount of data transmitted from a frame memory. Furthermore, the present invention can support input signals of an output apparatus even if the input signals have different frame rates.

What is claimed is:

1. A receiver comprising:
    a signal generator for generating a first vertical synchronous signal for a high definition (HD) image, a first field identification signal for an interlace HD image, a second vertical synchronous signal for a standard image, and a second field identification signal for a standard image;
    a first display processor for processing a received HD decoded image to an HD display format according to the first vertical synchronous signal and the first field identification signal; and
    a second display processor for down-sampling the HD decoded image using the first and second vertical synchronous signals and the first and second field identification signals, and providing a standard definition (SD) image signal having a standard display format that is different from the HD display format.

2. The receiver of claim 1, further comprising:
    a decoder for decoding a received HD video bitstream and providing an HD decoded image;
    a frame memory for storing the HD decoded image, from which data is simultaneously read by the first and second display processors, wherein the first display processor reads data in units of a frame or a field, and the second display processor reads data in units of a field; and
    a field buffer for temporarily storing the field data of an SD image which has been processed by the second display processor.

3. The receiver of claim 1, wherein the second display processor comprises:
    an SD display controller for generating a down-sampling on/off signal by calculating the difference in time between the first and second vertical synchronous signals, and generating a first control signal representing whether the received HD decoded image is a progressive image or an interlace image, and a second control signal representing SD output image field information;
    a down sampler for down-sampling the HD decoded image into an SD display format signal according to the down-sampling on/off signal and the first and second control signals; and
    a standard image signal generator for generating the output of the down sampler as a standard image signal according to the second vertical synchronous signal and the second field identification signal.

4. The receiver of claim 3, wherein the down sampler performs no down-sampling when the temporal difference between the first and second vertical synchronous signals is a predetermined duration, and performs down-sampling in all other cases.

5. The receiver of claim 3, wherein the down sampler comprises:
    a horizontal down sampler for horizontally down-sampling the received HD decoded image according to the down-sampling on/off signal and providing a horizontally down-sampled signal;
    a line memory for storing the horizontally down-sampled signal in units of a line; and
    a vertical down sampler for receiving the horizontally down-sampled signal and the previous horizontally down-sampled signal stored in the line memory, and vertically down-sampling the received signals according to the down-sampling on/off signal, the first and second control signals, and the second vertical synchronous signal.

6. The receiver of claim 5, wherein the vertical down sampler performs vertical down-sampling by interpolating the horizontally down-sampled signal which is provided from the horizontal down sampler, and the previous horizontally down-sampled signal which is provided from the line memory.

7. The receiver of claim 5, wherein the vertical down sampler vertically down-samples the horizontally down-sampled signal which is provided from the horizontal down sampler.

8. The receiver of claim 1, wherein the receiver is a high definition television.

9. The receiver of claim 1, wherein the receiver is a standard definition television having a set-top box.

10. The receiver of claim 1, wherein the standard image signal is a PAL signal, and the second synchronous signal has a period of 50 Hz.

11. The receiver of claim 1, wherein the standard image signal is an NTSC signal, and the second synchronous signal has a period of 60 Hz.

12. A method of simultaneously displaying signals having different display formats and/or different frame rates, the method comprising the steps of:

(a) decoding a received high definition (HD) image and providing an HD decoded image;

(b) processing the HD decoded image to an HD display format according to a first vertical synchronous signal and a first field identification signal for an interlace HD image; and (c) down-sampling the HD decoded image using the first vertical synchronous signal for an HD image, the first field identification signal for an HD image, a second vertical synchronous signal for a standard image, and a second field identification signal for a standard image, and providing a standard image signal having a standard display format that is different from the HD display format.

13. The method of claim 12, wherein the step (c) comprises the substeps of:

(c1) calculating the temporal difference between the first and second vertical synchronous signals and generating a down-sampling on/off signal;

(c2) generating a first control signal representing whether the HD image is a progressive or interlace image, and a second control signal representing the information on the field of a standard definition (SD) output image, on the basis of the first and second vertical synchronous signals and the first and second field identification signals;

(c3) down-sampling the HD decoded image to an SD display format signal according to the down-sampling on/off signal and the first and second control signals, and providing a down-sampled signal; and (c4) outputting the down-sampled signal as a standard image signal according to the second vertical synchronous signal and the second field identification signal.

14. The method of claim 13, wherein in the step (c3), down-sampling is not performed when the temporal difference between the first and second vertical synchronous signals is a predetermined duration.

15. The method of claim 13, wherein the step (c3) comprises the substeps of:

(c3-1) horizontally down-sampling the HD decoded image according to the downsampling on/off signal and providing a horizontally-downsampled signal;

(c3-2) delaying the horizontally-downsampled signal by one line and providing a delayed horizontally-downsampled signal; and (c3-3) vertically down-sampling the horizontally down-sampled signal and the delayed horizontally down-sampled signal according to the down sampling on/off signal, the first and second control signals, and the second vertical synchronous signal.

16. The method of claim 15, wherein in the step (c3-3), the horizontally down-sampled signal and the delayed horizontally down-sampled signal are interpolated and vertically down-sampled.

17. The method of claim 15, wherein in the step (c3-3), the horizontally down-sampled signal is directly vertically down-sampled without processing.

18. The method of claim 12, wherein the standard image signal is a PAL signal, and the second synchronous signal has a period of 50 Hz.

19. The method of claim 12, wherein the standard image signal is an NTSC signal, and the second synchronous signal has a period of 60 Hz.

* * * * *